(12) United States Patent
Tsai et al.

(10) Patent No.: US 8,336,771 B2
(45) Date of Patent: Dec. 25, 2012

(54) PAYMENT CARD TERMINAL DONGLE FOR COMMUNICATIONS DEVICES

(75) Inventors: Hwai Sian Tsai, Hong Kong (HK); Wing Cheong Chan, Hong Kong (HK)

(73) Assignee: BBPOS Limited, Hong Kong (HK)

( * ) Notice: Subject to any disclaimer, the term of this patent is extended or adjusted under 35 U.S.C. 154(b) by 182 days.

(21) Appl. No.: 12/767,831

(22) Filed: Apr. 27, 2010

(65) Prior Publication Data
US 2011/0259957 A1 Oct. 27, 2011

(51) Int. Cl.
*G06K 5/00* (2006.01)
(52) U.S. Cl. .......................... 235/380; 235/382
(58) Field of Classification Search ............ 235/380, 235/382, 492; 705/35, 39
See application file for complete search history.

(56) References Cited

U.S. PATENT DOCUMENTS
2008/0016004 A1* 1/2008 Kurasaki et al. ............... 705/67
* cited by examiner

*Primary Examiner* — Ahshik Kim
(74) *Attorney, Agent, or Firm* — AKC Patents LLC; Aliki K. Collins

(57) ABSTRACT

A dangle, which plugs into the audio/earpiece jack of host devices, allows them to accept payment cards as a point of sale (POS) terminal. It contains a magnetic stripe (magstripe) card reader, a smart card reader, and/or a proximity card reader (reader(s)); a microprocessor or microcontroller (CPU); and a circuit for drawing power from a digital audio signal (power circuit). Payment card data is collected by the reader(s), passed to the CPU where it is encrypted, encoded, and modulated, sent to the host device through the Microphone input contact of the audio/earpiece jack, then transmitted via one the host device's networks to a merchant account provider for processing. A digital audio signal, constantly generated by the host device, provides power to the dongle via the power circuit. The power circuit converts the digital audio signal to stable DC power with the appropriate voltage for powering the dongle's other components.

14 Claims, 6 Drawing Sheets

PAYMENT CARD TERMINAL DONGLE FOR COMMUNICATIONS DEVICES

BACKGROUND OF THE INVENTION

1. Technical Field/Field of the Invention

The present invention is a dongle connected to the audio/earpiece jack/port of cellphones, personal digital assistants (PDAs), smartphones, laptops, netbooks, and other networked devices (host devices) which allows them to read the card data from credit card, debit card, charge card, etc for secure payment card transactions as point of sale (POS) card terminals. The dongle contains no battery. It is powered by the sound wave playing continuously from cellphones, personal digital assistant (PDA), smartphones, laptops, netbooks, and other networked devices.

2. Background Art

Credit cards, debit cards, charge cards, etc. are all popular payment methods for conducting day-to-day financial transactions. These payment cards are usually used in conjunction with POS card terminals which contain magnetic stripe card, smart card, and/or proximity card readers. The majority of these card terminals are connected to their merchant account providers—the hubs for electronic funds transfers—through wired telephone and internet connections. Terminals do exist which provide wireless functionality through Wi-Fi, Bluetooth, and various cellular networks (e.g. GSM, CDMA, etc.); however, they are expensive and often require the user to purchase a wireless connectivity plan specifically for the device. Also, even wired card terminals are not cheap.

Most people already own some kind of device connected to the Internet or a telephone network, however, such as a cellphone, personal digital assistant (PDA), smartphone, laptop, netbook, etc. When most people wishing to operate a POS card terminal, be it wired or wireless, already own the majority of the hardware necessary for conducting payment card transactions, purchasing attachments which provide terminal capability to their existing devices may be more cost-effective than purchasing new, dedicated card terminals. In addition, it is often redundant for wireless card terminal operators, usually small merchants without permanent shop fronts, to purchase terminals with dedicated connectivity plans, as they already own a device—or multiple devices—with cellular or internet wireless connectivity.

Cellphones, PDAs, smartphones, laptops, netbooks, and other networked devices contain a variety of different hardware ports, however. Often, hardware connectivity options common for one type of device will not be common for another type of device. For example, while the majority of laptops and netbooks contain one or several USB-A connectors, cellphones and smartphones usually lack a USB-A port. In the present art, while POS terminal dongles do exist for some networked devices, the hardware connectivity methods they utilize limit the number of devices they can support. For example, card terminal dongles which connect via Apple's 30-pin dock connector for iPhones, iPods, and iPads cannot be used by the large number of devices which do not contain this port. Many devices are currently unsupported by the present art's card terminal dongle options.

Furthermore, some of the external ports are designed for data communication. They do not provide power source for a device connected to the port. In this case, the dongle must have internal battery for operation.

BRIEF SUMMARY OF THE INVENTION

The present invention consists of a dongle that plugs into the audio/earpiece jack of a networked device and enables the device to operate as a point of sale (POS) payment card terminal. The dongle contains a magnetic stripe (magstripe) card reader, a smart card reader, and/or a proximity card reader (reader(s)); a microprocessor or microcontroller (CPU); and a circuit for drawing power from a digital audio signal (power circuit). When a card is read by the reader(s), the card's data is first passed to the CPU, which encrypts, encodes, and modulates the data. The CPU then sends the card's information to the host device through the microphone input contact of the audio/earpiece jack. Once the data is received by the host device, it is transmitted via one its networks to a merchant account provider for processing. A digital audio signal, constantly generated by the host device, provides power to the dangle via the power circuit. The power circuit converts the digital audio signal to stable DC power with the appropriate voltage for powering the dongle.

DETAILED DESCRIPTION OF THE INVENTION

Reference will now be made in detail to several example embodiments of the disclosed invention. Each example is provided as an explanation of the present technology, and should not be construed as a limitation of the present technology. While the subject matter will be described in conjunction with the alternative embodiments, it will be apparent to those having ordinary skill in the art that further modifications and variations can be made to the present technology without departing from the spirit or scope thereof. Thus, it is intended that the present subject matter covers such modifications and variations, inasmuch as they come within the scope of the appended claims.

Figure 1:
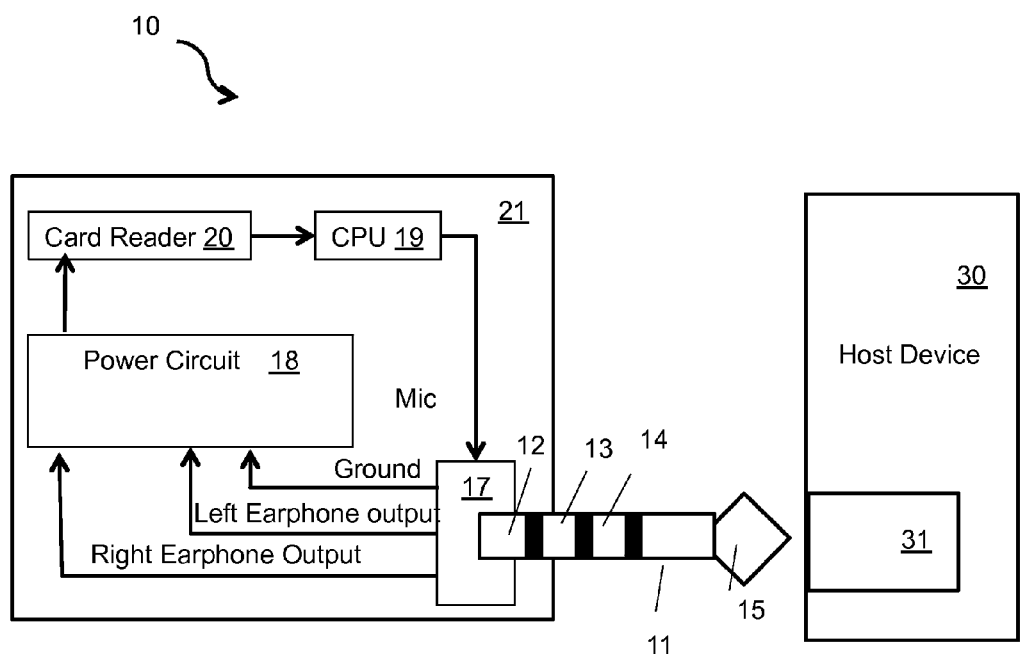
FIG. 1 is the abstract schematic of the dongle as connected to a host device. The host device as shown in the figure is not part of the invention. It is included since it is connected with the invention.

Referring to the FIG. 1, wherein like number refers to the like item, number 10 identifies the preferred embodiment of the present invention. It is comprised of a housing 21 with external audio jack 11; a magnetic stripe (magstipe) card reader, smart card reader, a proximity card reader and/or near field communication (NFC) card reader (card reader(s)) 20; a microprocessor or microcontroller (CPU) 19; and a circuit for drawing power from a digital audio signal (power circuit) 18. The audio jack 11 has four contact points, 12, 13, 14 and 15. When the audio jack 11 is being plugged into the audio port 31 of a host device 30, contact point 14 and contact point 15 are connected to the left earphone output and right earphone output of the host device 31 respectively; contact point 12 and contact 13 are connected to the microphone input and ground of the host device respectively. Contact points 12, 14 and 15 are connected to the power circuit 18 of the dongle. The power circuit 18 provides power for operation of the CPU 19 and Card reader 20. The output of the CPU 19 is connected to the contact point 13 of the audio jack 11, which is connected to the microphone input of the host device 30.

Figure 2:
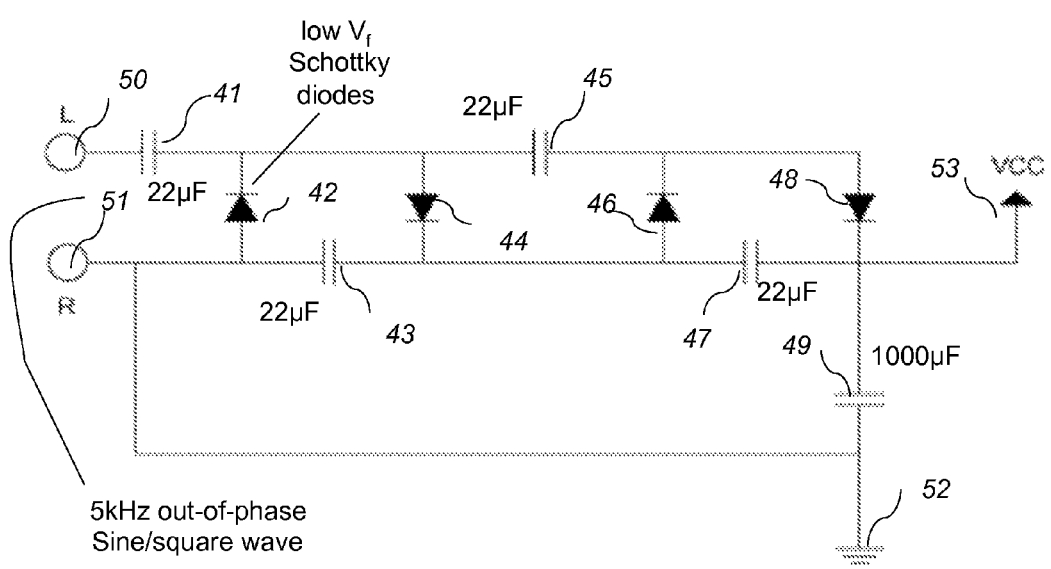
FIG. 2 is one possible implementation of the power circuit
Figure 3:
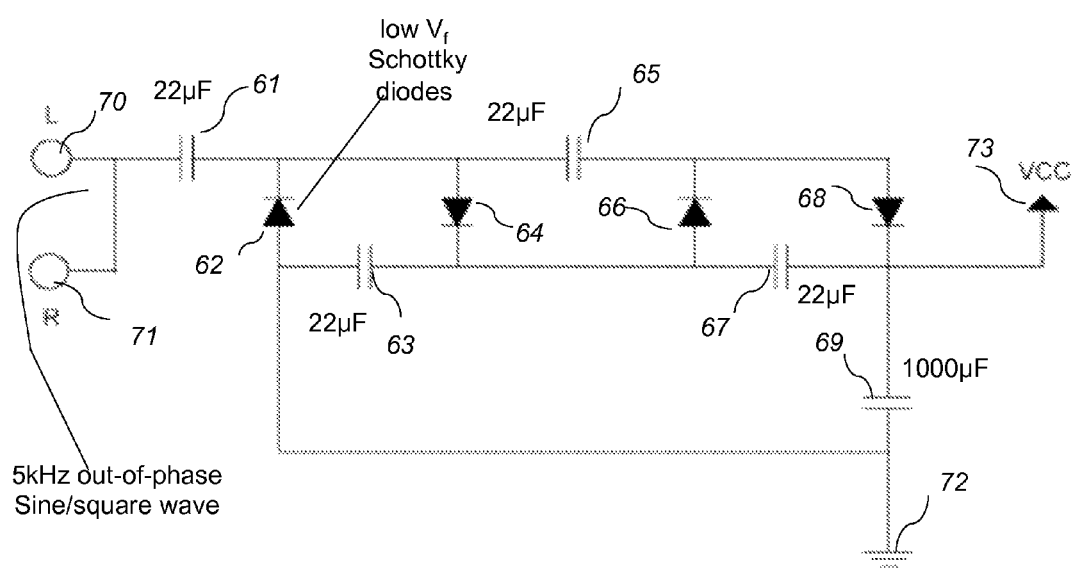
FIG. 3 is another possible implementation of the power circuit
Figure 4:
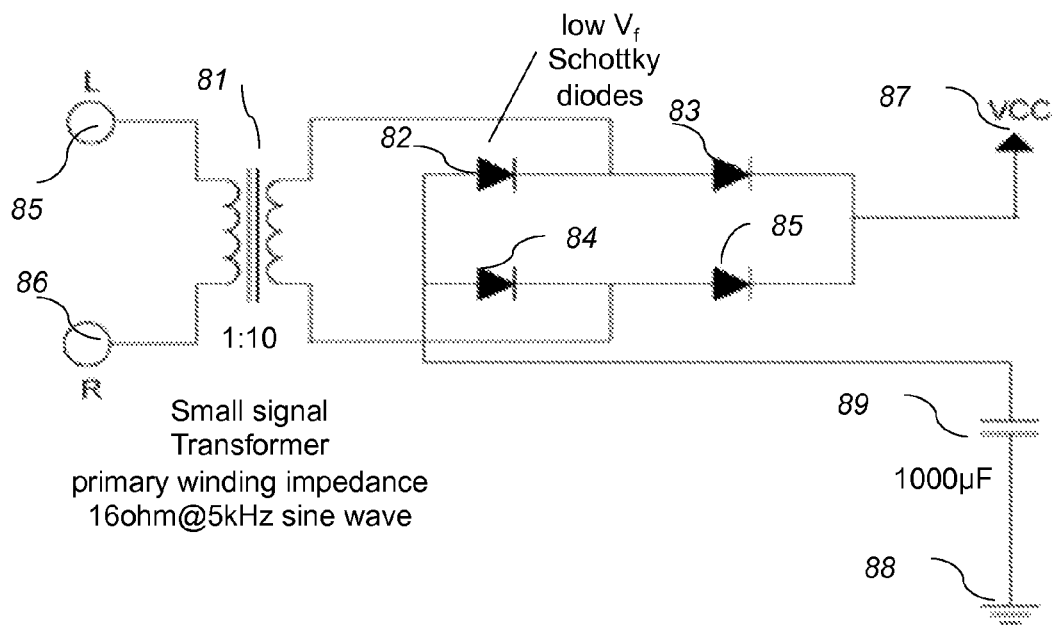
FIG. 4 is a third possible implementation of the power circuit
Figure 5:
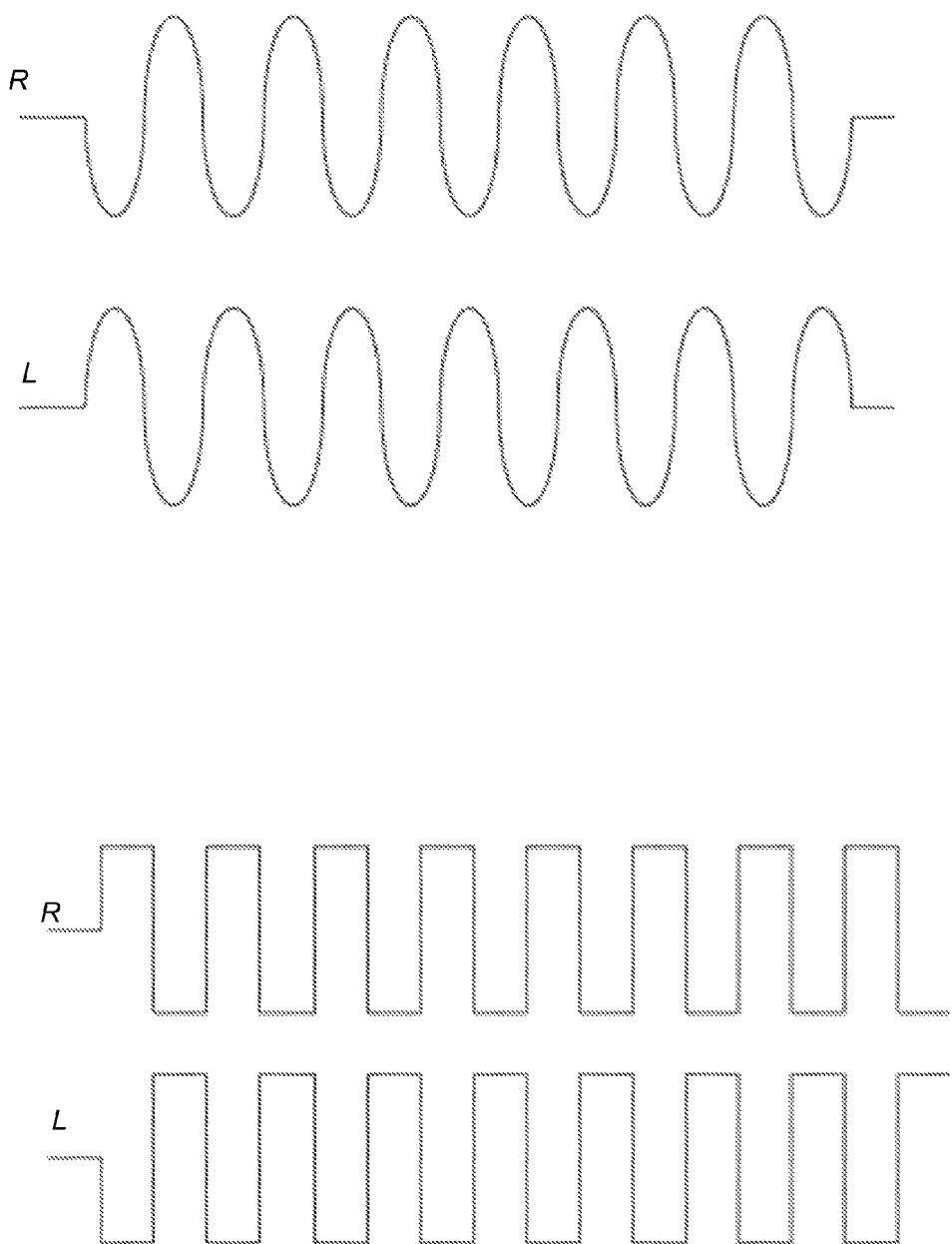
FIG. 5 is two possible type of continuous anti-phase sound wave to be played in the Left Channel (L) and the Right Channel (R) of the host device.

All the dongle's operations are powered by the power circuit 18. FIGS. 2-4 depicts three schematics for implementation of the power circuit. Referring to the FIG. 2, the input of the circuit is the left earphone output 50 and the right earphone output 51 of the host device 30 in FIG. 1. The output of the circuit is VCC 53, which provides DC power to the CPU and Card reader. The power circuit is comprised of four small capacitors 41, 43, 45 and 47, four diodes 42, 44, 46 and 48 and a larger capacitor 49. The two diodes 42, 44 and two capacitors 41, 43 form a voltage doubler circuit. It converts the input voltage from AC to DC and doubles the input voltage. Another two diodes 46, 48 and another two capacitor 45, 47 form another voltage doubler which further double the input voltage. The input source of the circuit is an out-of-phase sine/square wave in FIG. 5. The sound wave is produced by the host device. After two voltage doublers, the output voltage is a DC voltage which has amplitude being amplified by four times. The large capacitor 49 serves two functions. It stabilizes the DC power source. When the continuously sound wave is stopped, it acts as power reservoirs to provide some energy for the device to finish some operations.

Figure 6:
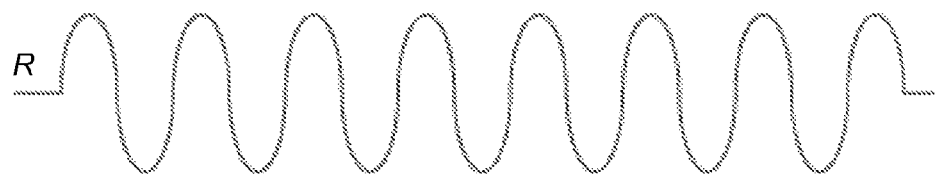
FIG. 6 is two possible type of continuous in-phase sound wave to be played in the Left Channel (L) and the Right Channel (R) of the host device.
Figure 6:
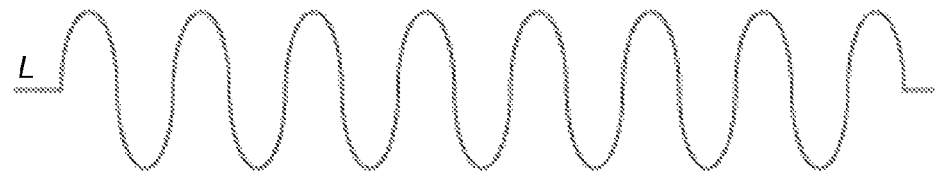
Figure 6:
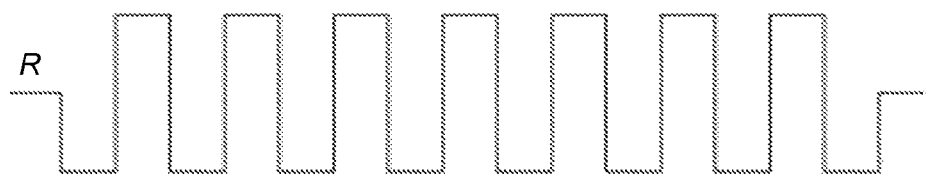
Figure 6:
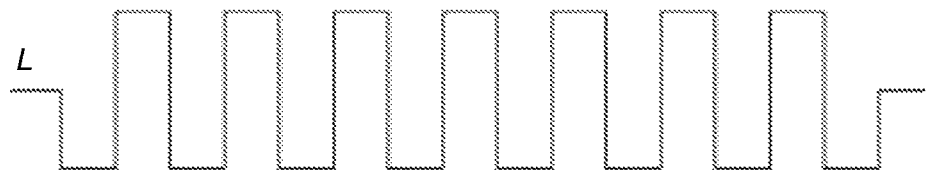

The operation theory of FIG. 3 is similar to FIG. 2 except that the input source is an in-phase continuously sound wave in FIG. 6.

Referring to the FIG. 4, the input of the circuit is the left earphone output 85 and the right earphone output 86 of the host device 30 in FIG. 1. The output of the circuit is VCC 87, which provides DC power to the CPU and Card reader. The power circuit is comprised of a transformer 81, four diodes 82, 83, 84 and 85, and a larger capacitor 89. The input source of the circuit is an out-of-phase sine/square wave in FIG. 5. The sound wave is produced by the host device. The transformer 81 amplifiers the input DC voltage by 10 times. The four diodes 82, 83, 84 and 85 form a bridge circuit (one type of rectifier circuits) which converts power source from AC to DC. The large capacitor 89 serves two functions. It stabilizes the DC power source. When the continuously sound wave is stopped, it acts as power reservoirs to provide some energy for the device to finish some operations.

The reader(s) is connected to the dongle's CPU. When presented with an appropriate magstripe card, smart card, or proximity card, it reads the cards information and passes it to the CPU.

The card information the CPU receives from the reader is raw and unprotected; therefore, to maintain security, the CPU encrypts the data before sending it to the host device. The encryption may be performed using AES, Blowfish, or any other cryptographic standard. A huge number of possibilities exist for this task. Once the data is encrypted, it is encoded by channel coding such as Manchester coding or bit stuffing, modulated by frequency-shift keying (FSK), dual-tone multi-frequency signaling (DTMF), or orthogonal frequency division multiplexing (OFDM), and transmitted to the host device as an audio signal through the microphone input contact of the audio/earpiece jack.

Software may be loaded onto the host device which allows it demodulate and decode the data, as well as decrypt and re-encrypt it if necessary, before transmitting it by data network to a merchant account provider. This software also provides constant audio signal output to power the dongle. Alternatively, if the device is capable of connecting to a voice network (e.g. GSM, CDMA, etc.), no software needs to be loaded on the device. After establishing a voice connection with a remote server, a card is read by the reader(s). The server plays a sound wave continuously, thus powering the device during the call. The data is encrypted, encoded, and modulated, then transmitted as an audio signal to the remote server. The remote server then demodulates and decodes the data, as well as decrypting and re-encrypting it if necessary, before transmitting it through a data network connection to a merchant account provider.

The invention claimed is:

1. A payment card transaction device comprising:
   a payment card reader configured to read payment card data;
   a power generation circuit configured to provide power to the payment card transaction device;
   an audio jack connector;
   wherein said payment card reader is configured to connect to an audio plug of an external communication device via the audio jack connector; and
   wherein said power regeneration circuitry is configured to receive a continuous periodic sound wave from the external communication device and to convert the continuous periodic sound wave into an amplified DC electrical signal.

2. The payment card transaction device of claim 1, further comprising a microcontroller configured to receive the payment card data from the payment card reader and wherein the microprocessor is configured to encrypt the payment card data, to encode the payment card data, to modulate the payment card data and to send the encrypted, encoded and modulated payment card data to a microphone input of the external communication device.

3. The payment card transaction device of claim 2, further comprising an application configured to run on the external communication device and to generate the continuous periodic sound wave.

4. The payment card transaction device of claim 3, wherein the application is configured to demodulate and to decode the encrypted, encoded and modulated payment card data and then to send the decoded payment card data to a server configured to process a payment transaction.

5. The payment card transaction device of claim 2, wherein the external communication device is configured to make a phone call to a remote server and the remote server generates the continuous periodic sound wave.

6. The payment card transaction device of claim 5, wherein the remote server is configured to demodulate and to decode the encrypted, encoded and modulated payment card data and then to send the decoded payment card data to a server configured to process a payment transaction.

7. The payment card transaction device of claim 1, wherein the power generation circuit comprises a diode-capacitor voltage multiplier circuit.

8. The payment card transaction device of claim 1, wherein the power generation circuit comprises a transformer.

9. The payment card transaction device of claim 1, wherein the power generation circuit comprises a voltage stabilizer and a power storage.

10. The payment card transaction device of claim 1, wherein the payment card transaction device comprises one of a magnetic stripe card reader, a smart card reader, or a near field communication (NFC) card reader.

11. The payment card transaction device of claim 6, wherein the payment transaction comprises a debit card transaction or a credit card transaction.

12. The payment card transaction device of claim 1, wherein the external communication device comprises one of a mobile phone, a cellular phone, a personal digital assistant (PDA), a smart phone, a Blackberry™, an iPhone™, or a netbook.

13. A payment card transaction system comprising:
a payment card transaction device comprising a payment card reader configured to read payment card data, a power generation circuit configured to provide power to the payment card transaction device and an audio jack connector;
an external communication device comprising an audio plug;
wherein said payment card reader is configured to connect to an audio plug of an external communication device via the audio jack connector; and
wherein said power regeneration circuitry is configured to receive a continuous periodic sound wave from the external communication device and to convert the continuous periodic sound wave into an amplified DC electrical signal.

14. A method for processing a payment card transaction comprising:
providing a payment card reader configured to read payment card data;
providing a power generation circuit configured to provide power to the payment card transaction device;
providing an audio jack connector;
wherein said payment card reader is configured to connect to an audio plug of an external communication device via the audio jack connector; and
wherein said power regeneration circuitry is configured to receive a continuous periodic sound wave from the external communication device and to convert the continuous periodic sound wave into an amplified DC electrical signal.

* * * * *